Dec. 12, 1961 L. E. SODERQUIST 3,012,277
CENTER MECHANISM FOR TIRE PRESSES
Filed Feb. 13, 1958 5 Sheets-Sheet 2

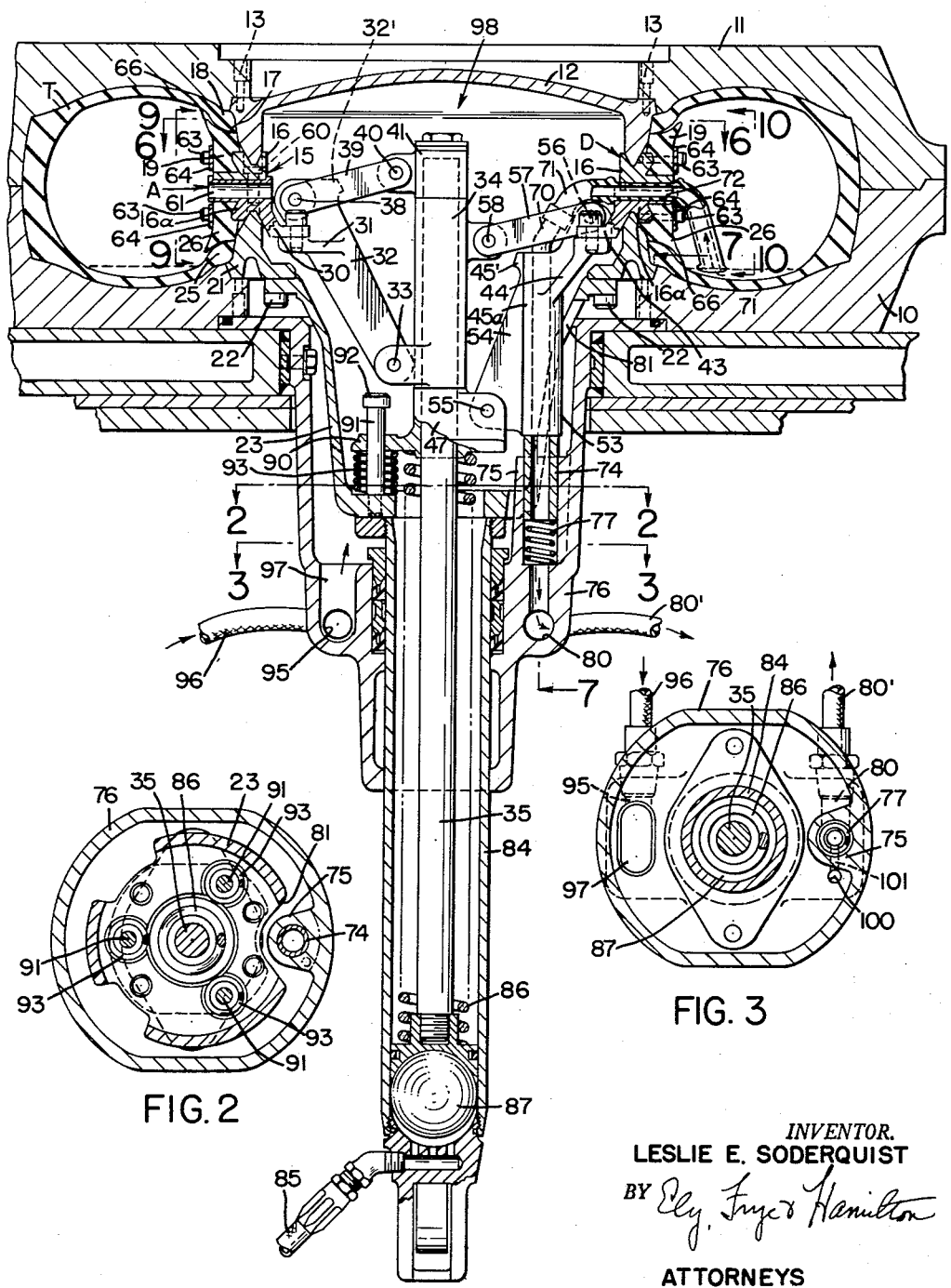

INVENTOR.
LESLIE E. SODERQUIST
BY Ely, Frye & Hamilton
ATTORNEYS

Dec. 12, 1961 L. E. SODERQUIST 3,012,277
CENTER MECHANISM FOR TIRE PRESSES
Filed Feb. 13, 1958 5 Sheets-Sheet 3

INVENTOR.
LESLIE E. SODERQUIST
BY
ATTORNEYS

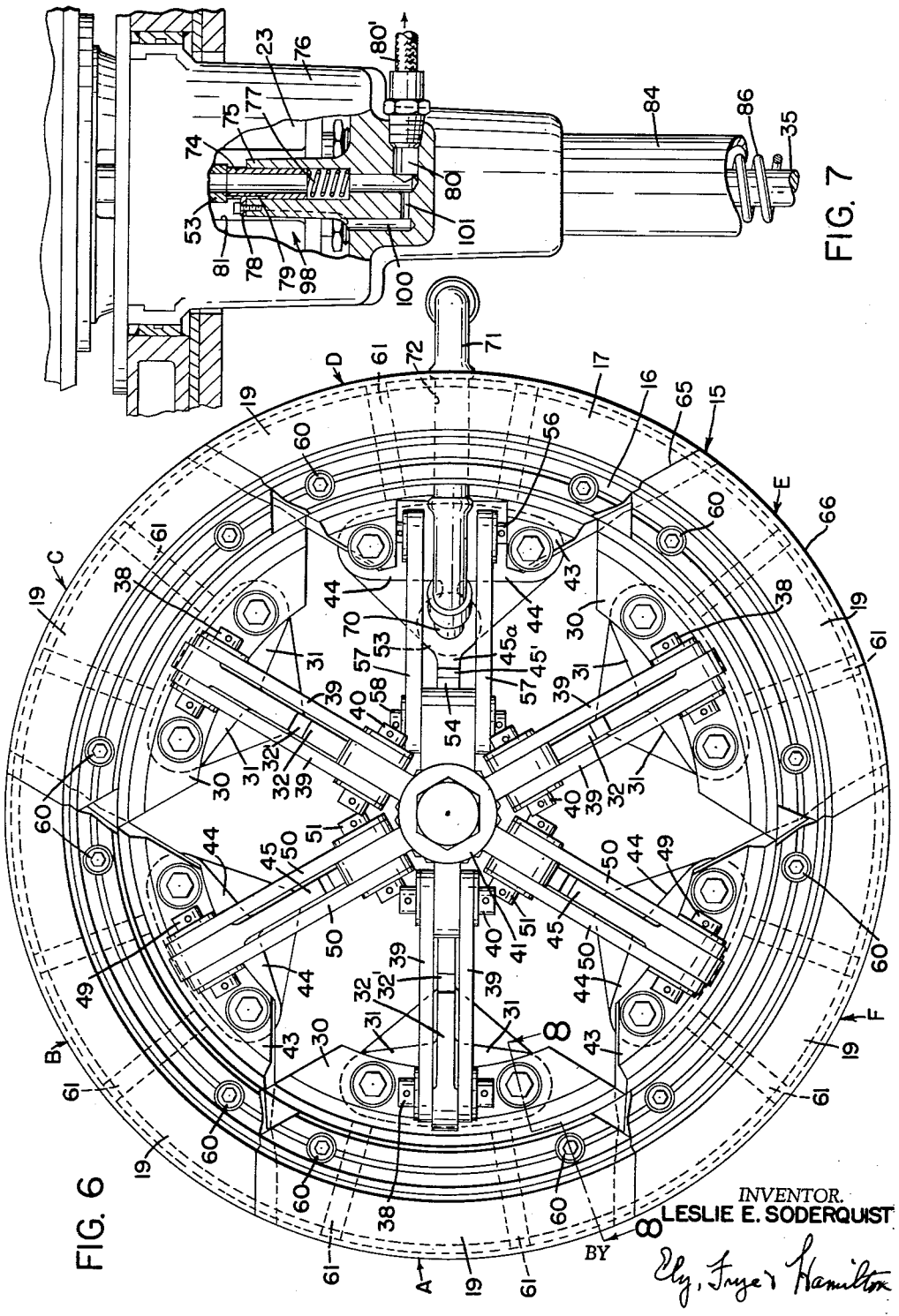

Dec. 12, 1961    L. E. SODERQUIST    3,012,277
CENTER MECHANISM FOR TIRE PRESSES
Filed Feb. 13, 1958    5 Sheets-Sheet 5
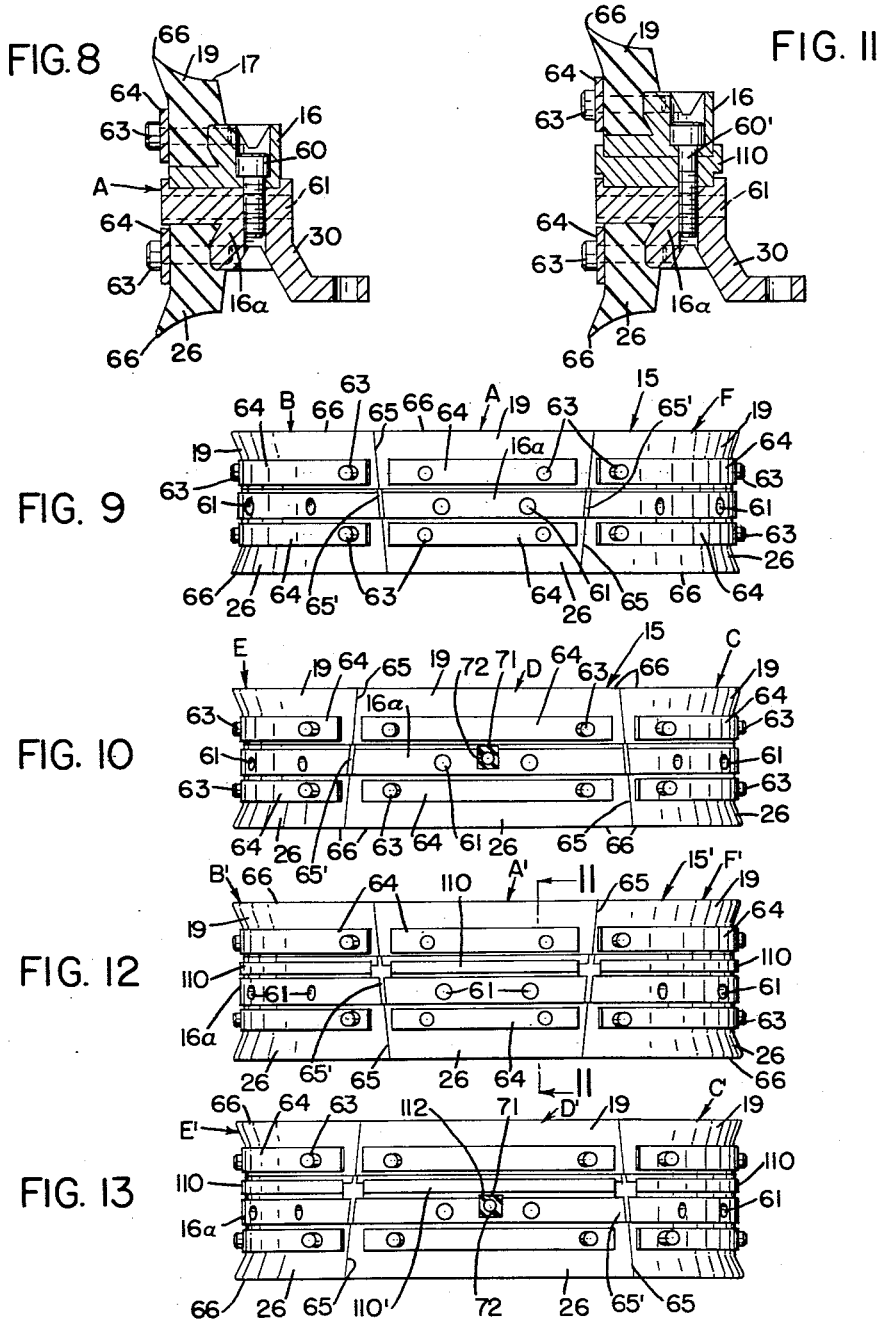
INVENTOR.
LESLIE E. SODERQUIST
BY Ely, Fryer Hamilton
ATTORNEYS United States Patent Office 3,012,277
Patented Dec. 12, 1961

3,012,277
CENTER MECHANISM FOR TIRE PRESSES
Leslie E. Soderquist, Silver Lake, Ohio, assignor to The McNeil Machine & Engineering Company, Akron, Ohio, a corporation of Ohio
Filed Feb. 13, 1958, Ser. No. 714,999
3 Claims. (Cl. 18—17)

This invention relates to new and improved center mechanism for use in tire presses wherein unvulcanized tire bands are shaped into tire form and vulcanized before they are removed from the presses.

This center mechanism is more particularly adapted for use in presses which handle tubeless tires, and enables the user to form, mold and cure tires without preshaping and without an air bag or diaphragm. However, it may be used also in handling tires which require the use of inner tubes when mounted on a vehicle.

While the invention is shown in connection with the operation of a single press, it will be obvious that it may also be used in the operation of dual presses.

One object of the invention is to provide novel center mechanism which includes a segmented ring that can be expanded into a green tire band as the latter is being shaped to compress the tire beads into the mold sections and mold rings to insure the proper conformation of the beads; said ring also being collapsible to a position out of the path of a cured tire as the latter is being removed from the press, and while a new tire band is being inserted in the press.

Another object is to provide novel means for expanding and collapsing the segmented ring.

A further object is to provide rubber or rubber-like elastic feet on the segmented ring which are relatively large in cross-section to provide an ample amount of elasticity so that beads of varying cross-section can be accommodated without adjustments.

A further object is to design the rubber feet so as to give the minimum amount of "ridge" at each toe where the transformation is made from compression molding to steam molding.

A further object is to provide a segmented ring that can be used with tires of varying distances (rim widths) across the beads, by inserting a spacer of suitable thickness in each of the ring segments.

Further objects are to provide an arrangement wherein the lower mold ring is contoured to readily receive and center the lower tire bead and hold the tire from tipping so the upper mold ring can enter the tire; the lower mold ring is movable relative to the mold so this ring can strip the cured tire from the mold; the upper mold ring is contoured to center the upper tire bead, and is a closed ring to seal in the shaping pressure medium and the pressure chamber; and both mold rings accurately align the segmented ring during the final closing motion of the press by means of mating tapered faces on all of the rings.

A further object is to provide novel means for draining water from the tire after cure and before removal from the press.

Other objects and advantages will become apparent from the following description taken in conjunction with the accompanying drawings.

Only portions of the two mold sections, sufficient to understand the present invention, have been shown, and none of the mechanism for manipulating the upper mold section has been shown as this has nothing to do with the present invention, any type of press operating mechanism being adaptable, as long as the final closing movement and initial opening movement of the upper mold section is vertical, which movement is conventional in most present day tire presses.

Also no showing has been made of any wiring diagram and switches by which the movements of the mechanism are automatically controlled, since such details may be readily designed by any qualified electrical engineer when the sequence of operations is fully understood.

In the drawings:

FIG. 1 is a vertical section through a part of a tire press in curing position, with the center mechanism in expanded position shown partly in section and partly in elevation, FIG. 2 is a horizontal section taken substantially on line 2—2 of FIG. 1.

FIG. 3 is a similar section taken substantially on line 3—3 of FIG. 1,

Figure 4:
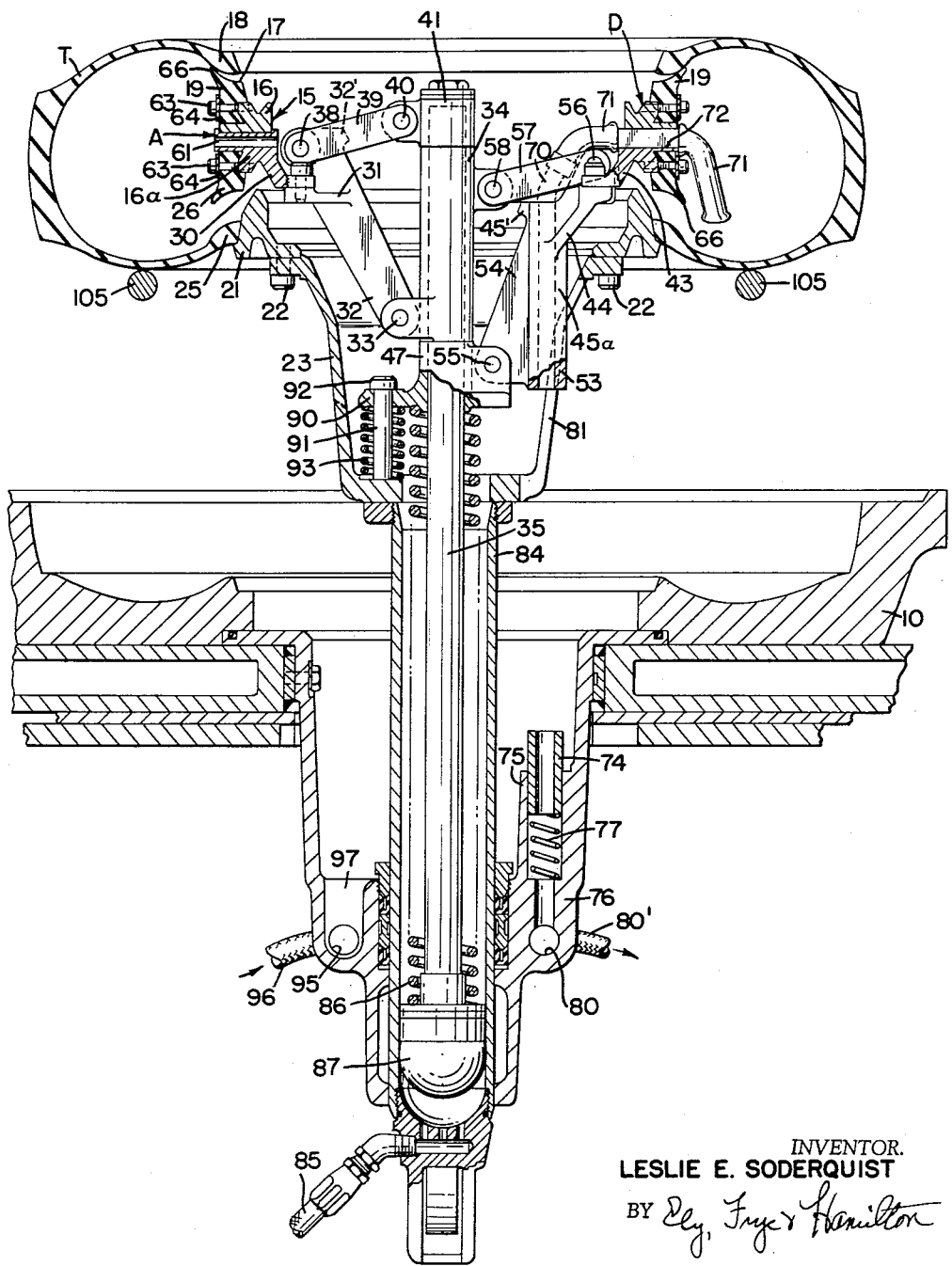
Figure 5:
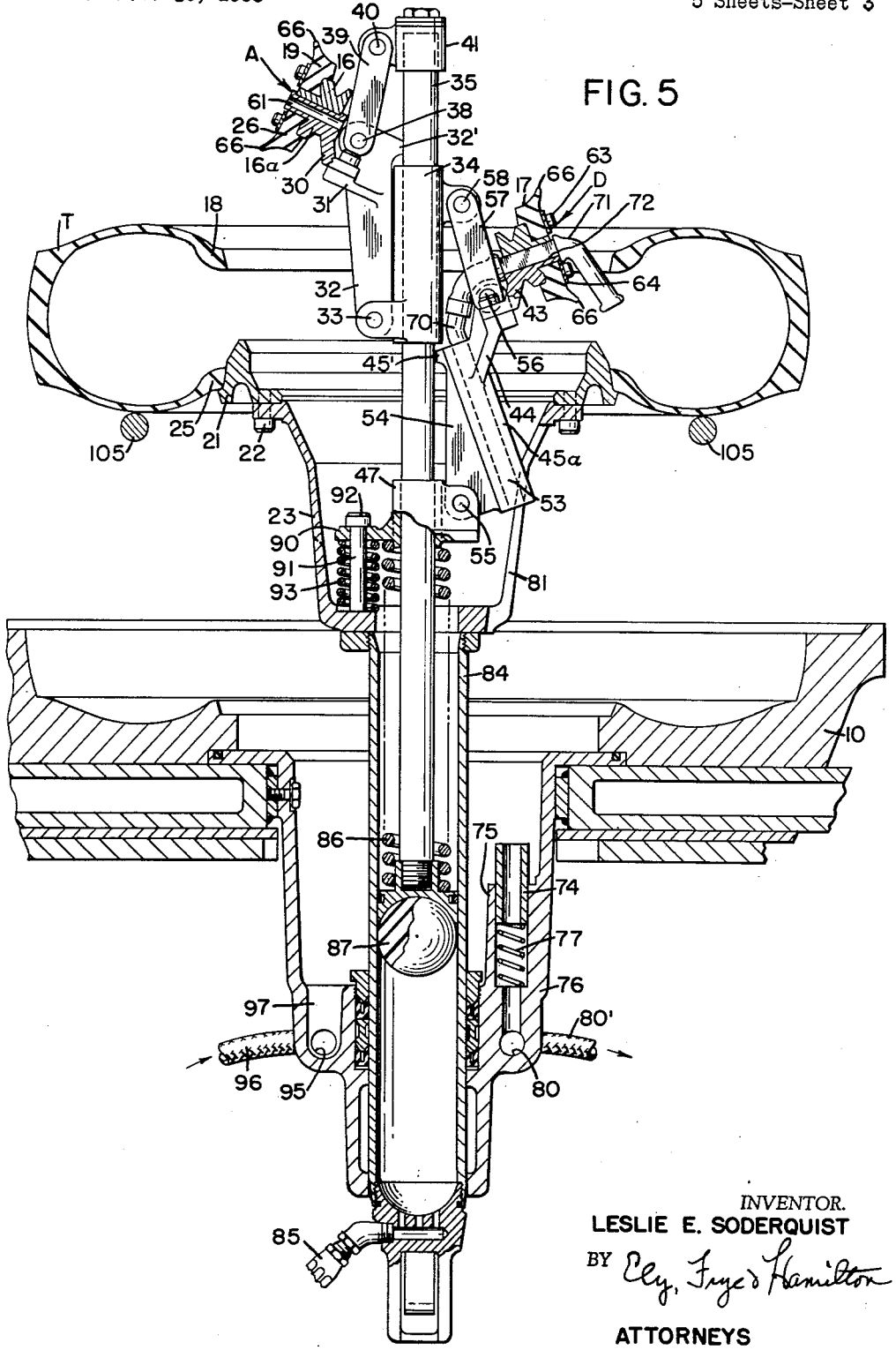

FIG. 4 is a view similar to FIG. 1, with the upper mold section raised, and with the tire stripped out of the lower mold section, but with the segmental ring portion of the center mechanism still in expanded position, FIG. 5 is a view similar to FIG. 4 with the segmental ring collapsed out of the tire, FIG. 6 is an enlarged horizontal section taken substantially on line 6—6 of FIG. 1, with the upper mold section and mold ring removed, FIG. 7 is a vertical section taken substantially on line 7—7 of FIG. 1, FIG. 8 is a sectional view taken substantially on line 8—8 of FIG. 6, FIG. 9 is a side elevation of the segmented ring substantially as viewed in the direction indicated by line 9—9 of FIG. 1, FIG. 10 is a similar view substantially as seen in the direction indicated by line 10—10 of FIG. 1, FIG. 11 is a section taken substantially on line 11—11 of FIG. 12, showing a modified form of segmented ring, FIG. 12 is a view similar to FIG. 9 showing the modified form of segmented ring, and FIG. 13 is a view similar to FIG. 10 showing the modified form of segmented ring.

Referring to the drawings, the numeral 10 designates the lower, stationary, fluid-jacketed mold section of a tire press having an upper, movable mold section 11. In FIG. 1 the press is shown in closed, curing position, with a tire T therein which has been forced from band shape into toroidal shape in the conventional manner by the action of the upper mold section during its downward movement exerting the required pressure on the band, which, with the admission of a low shaping pressure to the interior of the band, brings it to tire form concurrently with the closing of the press. After the press is closed, the full shaping pressure is admitted to the interior of the tire, and in FIG. 1 it will be assumed that the tire has been completely cured by steam or hot water pressure, that the pressure has been relieved, that the water condensate has been removed from the tire by means to be referred to later, and that the tire is ready to be removed from the press.

No attempt has been made to show any particular tread design on the tire since this is controlled by the configurations on the inner faces of the mold sections. If the tire T is of the tubeless type, it will have a conventional impervious lining on its interior, and sealing ribs along the exterior of its beads.

As indicated in FIG. 1, the upper mold section 11 has the upper mold ring 12 bolted thereto as at 13, and this mold ring is solid across the top to prevent escape of the shaping pressure medium when the press is closed. Mold ring 12 is contoured on its lower face to fit into the upper section 16 of the body portion of the segmented ring, indicated in its entirety by the numeral 15, and is tapered at 17 for proper engagement with the upper tire bead 18 and the upper rubber foot portion 19 of ring 15, which will be referred to later.

The lower mold ring 21 is bolted as at 22 to a movable bell-shaped housing 23, which will be referred to later, and is also contoured to fit into the lower section 16a of the body portion of ring 15. Mold ring 21 is also tapered for proper engagement with the lower tire bead 25, the lower rubber foot portion 26 of ring 15, and the lower mold section 10.

The ring 15 is formed, in this instance, of six keystone shaped segments (FIG. 6) designated A, B, C, D, E, and F, respectively. Alternate segments A, C and E are arranged to be moved from the expanded position shown in FIGS. 1 and 4 to the collapsed position shown in FIG. 5, by being pivoted or swung out of the tire and then raised upwardly. The movement is reversed when these three segments are returned to expanded position. Alternate segments B, D and F are moved from the FIG. 1 position to their FIG. 5 position by being pivoted or swung out of the tire into a plane below segments A, C and E, and the movement is reversed when these segments are expanded into their FIG. 1 position.

Segments A, C and E which are tapered downwardly each have a downwardly and inwardly extending bracket 30 to which is bolted a pair of bracket arms 31 that extend from opposite sides of links 32, the lower ends of which are pivoted at 33 to the lower end of a sleeve 34 which surrounds a piston rod 35, but does not interfere with vertical movement of rod 35, as will be later explained. The upper end of each link 32 is pivoted at 38 between the outer ends of a pair of shorter links 39, the inner ends of which are pivoted at 40 to a cap 41 bolted to the upper end of piston rod 35.

Segments B, D and F which are tapered upwardly also each have a downwardly and inwardly extending bracket 43 to which is bolted a pair of bracket arms 44 that extend from opposite sides of links 45 with respect to segments B and F, and from opposite sides of a different type link 45a with respect to segment D. The lower ends of links 45 are pivoted to a collar 47 which surrounds piston rod 35 below sleeve 34, and their upper ends are pivoted at 49 between the outer ends of a pair of shorter links 50, the inner ends of which are pivoted at 51 to sleeve 34 a selected distance below the top of the latter.

In connection with segment D, link 45a has a tubular portion 53, for a purpose to be described, and a reduced web portion 54 pivoted at 55 to collar 47. The upper end of link 45a is pivoted at 56 between the outer ends of a pair of links 57, that are identical with links 50 except that they are spaced farther apart so as not to interfere with the movement of connections, to be referred to, which extend from the tubular portion 53 of link 45a. The inner ends of links 57 are pivoted at 58 to sleeve 34.

As more clearly shown in FIGS. 6 and 8, the upper body section 16 of each ring segment is bolted to its lower body section 16a by means of bolts 60, and each body section 16a has a pair of spaced radial passages 61 through which pressure is admitted to the inside of the tire. The upper and lower rubber feet portions 19 and 26 of each ring segment are secured to their adjacent body sections 16 and 16a respectively, by bolts 63, and arcuate metallic bands or straps 64, slightly less in length than the rubber feet, are interposed between the bolt heads and the rubber feet (FIGS. 9 and 10). As more clearly seen in FIGS. 9 and 10, the respective ring segments meet their adjacent segments on an angle of about 5° to the vertical, as indicated at 65, which permits proper collapse and expansion of the segments. This arrangement provides slight spaces 65′, exaggerated in the drawings, between adjacent body sections of the segments, through which pressure may also enter the tire.

It will be noted that the rubber feet 19 and 26 are relatively large in cross section, and they are molded or otherwise formed of rubber or rubber-like composition which is sufficiently elastic to provide an ample amount of "give" so that beads of varying cross section can be accommodated without adjustment. The rubber feet are also formed with a pre-selected curve on their outer edges to press firmly against the tire beads and provide uninterrupted surfaces in contact with the inner surfaces of the tire beads, and terminate in a thin edge 66 at their toes, which arrangement provides a minimum amount of "ridge" on the inside of the tire at the toes where the transformation is made from compression molding to fluid pressure molding.

As indicated in FIGS. 1, 4 and 5, the upper end of the tubular portion 53 of link 45a has a short length of copper tubing 70 brazed thereto and one end of a length of flexible rubber or rubber-like tubing 71 is connected to tubing 70. The flexible tubing 71 passes through a squared opening 72 formed in sections 16 and 16a of ring segment D, and its other end terminates just above the bottom wall of the tire when the tire is being cured (FIG. 1), so that steam and hot water or condensate may pass out of the tire through tube 71. By holding flexible tubing 71 in the squared area 72 intermediate its ends, there is no tendency for this tubing to twist or turn out of its initial position.

The lower end of tubular portion 53 of link 45a is arranged, when the press is closed (FIG. 1) to engage the upper end of a piston-tube 74 and force the latter downwardly in cylinder 75 which is formed as part of the wall of a fixed bell-shaped housing 76, against the action of spring 77 mounted in the cylinder. Housing 76 is suitably secured to the fixed lower mold section 10 of the press. Upward movement of tube 74 by the spring is limited by means of a pin 78 bolted to the top of the cylinder, which pin extends into a vertical groove 79 (FIG. 7) formed in the upper portion of the tube. Thus, the movement of tube 74 by link 45a as the press closes is from the position shown in FIGS. 4 and 5 to the position in FIG. 1, which provides a through passage for steam or hot water or condensate from the bottom of the tire to an outlet port 80 at one side of the bottom of housing 76 which leads to a suitable receiving medium (not shown) through a flexible line 80′. When the press is opened, the tube 74 will return to its FIG. 4 position. During its movement, link 45a moves through an opening 81 in the movable bell-shaped housing 23.

The bottom of housing 23 is suitably secured to the upper end of a cylinder 84, and the piston rod 35 is movable through this cylinder and through housing 23. Piston rod 35 is movable upwardly by hydraulic pressure from a flexible line 85 leading to a source of pressure (not shown), and is movable downwardly by the action of spring 86 surrounding rod 35 between collar 47 and ball piston 87.

Cylinder 84 is also movable upwardly from its FIG. 1 position, through the lower portion of housing 76, to the position shown in FIGS. 4 and 5, and vice versa. The mechanism for moving cylinder 84 is not shown since it forms no part of the present invention, and any suitable mechanism may be utilized for this purpose, for example, the bell crank-cylinder mechanism disclosed in applicant's Patent No. 2,812,545 or Patent No. 2,836,847.

The lower end of collar 47 is provided with a horizontal flange 90 through which extend three spaced vertical pins 91 (one of which is visible in FIGS. 1, 4 and 5) having enlarged heads 92, which pins are threaded into the bottom wall of housing 23. Surrounding each pin 91 between housing 23 and collar 47 is a coil spring 93, which springs have a normal bias tending to raise collar 47 and all parts movable therewith from the FIG. 1 position upwardly until flange 90 strikes the heads 92 on pin 91.

At the lower end of housing 76, on the opposite side to outlet line 80′, an inlet port 95 is provided, which receives the fluid pressure, initially air for preliminary tire shaping, and thereafter steam or hot water for the curing pressure, through an incoming line 96, leading to suitable sources (not shown) of the pressure mediums being used. The pressure fluid passes upwardly through an oval-shaped passage 97 in the bottom portion of housing 76, and through opening 81 and other suitable openings in housing 23, into the upper part of an area 98 (FIG. 1), which, together with all the space above the bottom of housing 76, will be called a pressure chamber, although it only confines the pressure medium during and after the closing of the press.

A vertical port 100 (FIGS. 3 and 7) leads downwardly in the bottom portion of housing 76 and is connected by a reduced horizontal port 101 with the outlet port 80. This arrangement permits a syphoning action to remove hot water or condensate, through rubber tubing 71, from the bottom of the tire. In the event hot water under pressure, instead of steam, is being used as the curing medium, ports 100 and 101 would provide means to drain any water remaining after cure in the pressure area above the bottom of housing 76.

In operating the center mechanism we will start with the equipment in the position shown in FIG. 1, and will assume that the tire has been cured by using steam pressure after the mold was completely closed, the curing medium having passed from the inlet line 96 into the pressure chamber 98 and into the tire through radial passages 61 in the ring segments and spaces 65' between the ring segments, and having escaped from the tire through the rubber tubing 71, link 45a, and outlet line 80', either in the form of steam or as condensate. The tire is now ready for removal from the press.

As the press opens, the upper mold section 11 moves upwardly in a vertical path, carrying the upper mold ring 12 with it. As the upper mold ring raises, the lift springs 93 move upwardly and provide a force to raise the segmented ring 15 (still in expanded condition), all the operating links, sleeve 34, collar 47 and piston rod 35, until the flange 90 on collar 47 contacts the heads 92 on pins 91. This movement by springs 93 is sufficient to raise the segmented ring 15 clear of the lower mold ring 21.

As the press nears its fully open position, the cylinder 84 is moved upwardly, by the mechanism referred to in applicant's prior disclosures, to the position shown in FIG. 4. This movement raises the movable bell housing 23, the still expanded ring 15, all the linkage, and the lower mold ring 21, as a unit. This upward movement of the lower mold ring 21 strips the tire from the lower mold section 10 and raises it up to a position where unloading arms, indicated generally at 105, can be moved to a position under the tire to help support same. Since the unloading arms form no part of the center mechanism of the present invention, no particular type of arms have been shown, and any of the arms of this type previously disclosed by applicant, for example, in his Patent No. 2,832,991 or No. 2,832,992, or in his application Serial No. 671,319, filed July 11, 1957, now Patent No. 2,911,670, may be utilized.

With the arms 105 under the tire, the segmented ring 15 is collapsed and withdrawn from inside the tire to the position shown in FIG. 5. The collapse of ring 15 is accomplished by applying hydraulic pressure through line 85 to the bottom of piston 87. This pressure moves the piston 35 upwardly against the action of spring 86, raising the cap 41 upwardly and extending links 39 and 32 until the projection 32' on each of the latter links contacts piston rod 35. Then, continued upward movement of cap 41 and links 39 and 32 (which links now act as a unit) will raise sleeve 34. Since pivot points 51 of links 50 and 58 of links 57 are in a lower plane than pivot points 49 of links 50 and 56 of links 57, when sleeve 34 first moves upwardly the movement of pivot points 49 and 56 is initially away from the piston rod 35, until links 50 and 57 become horizontal. This movement of pivot points 49 and 56 away from rod 35 is desirable in order to be sure that ring segments A, C and E have moved to their completely collapsed positions, and will not interfere with the collapse of segments B, D and F. Now, as sleeve 34 continues to rise, links 50, 45 and 57, 45a are extended until the projections 45' on links 45 and 45a contact the piston rod 35. At this time, since any upward movement of collar 47 is prevented by the heads 92 on pins 91, the piston 87 is stalled.

The foregoing action of the piston rod 35 and sleeve 34 caused the ring segments A, C and E to pivot out of the tire and then to raise up (FIG. 5 position). As these segments were moving up, the remaining segments B, D and F were pivoted out of the tire into a plane (FIG. 5 position) below the first three segments. The unloading arms 105 now raise the tire off the lower mold ring 21, and over the collapsed ring segments and out of the press.

It will be noted that when the segmental ring is collapsed it is wholly within the projected inner circumference of the tire bead (see FIG. 5), so that an uncured band may be dropped from above onto its seat on the lower mold ring 21.

It will be apparent that after the pressure has been relieved from the tire, the sequence of operations to raise the tire and collapse the segmented ring may be reversed or otherwise manipulated to suit the conditions under which the press is being operated.

While the lower mold ring 21 is still up, an uncured tire band may be placed thereon either manually or with automatic equipment which applicant has designed in this field, but which forms no part of the present invention. The lower mold ring 21 is now lowered with the tire seated thereon until the mold ring seats in the lower mold section 10. The mold ring 21 is lowered by moving the cylinder 84 downwardly without releasing the hydraulic pressure acting on piston 87. This also lowers the center mechanism in its collapsed position. As the press closes, the final movement of the upper mold section 11 is vertical and as the upper mold ring 12 engages the upper tire bead, shaping air pressure is admitted through line 96 into the pressure chamber 98.

When the press is about six inches from being closed, a short delay occurs during which the hydraulic pressure acting against piston 87 is released. The spring 86 will then return the piston rod 35 to its initial position, which action will reverse the operation of the various links and expand the ring segments into the partially shaped tire.

The press then continues to close and the unformed upper tire bead contacts the upper rubber feet 19 on the ring 15 and forces the latter downwardly. This action also compresses the lift springs 93 on the pin 91. The ring 15 moves down until the lower rubber feet 26 contact the lower tire bead. As the press continues to close, it provides the force to form the tire beads by moving the beads against the rubber feet 19 and 26. When the press reaches its fully closed position, the tapered contours on the upper and lower mold rings in engagement with the ring 15 do the final centering and aligning of the segmented ring. The tire is now ready to receive the pressure medium with which it is to be cured.

In FIGS. 11, 12 and 13, I have shown a modified form of the segmented ring 15' in which an arcuate insert 110 is placed between the ring sections 16 and 16a. This permits the ring to be used with tires of varying distances (rim widths) between the beads. As indicated in FIG. 11, the bolts 60' which are longer than bolts 60, are utilized to secure the inserts 110 to the ring sections. In connection with the ring segment D', which would occupy the same position in ring 15' as segment D does in ring 15, the insert 110' is cut out at 112 to provide for the square opening 72 which receives the flexible tubing 71.

While a preferred embodiment of the invention has been shown and described, it will be apparent that the invention is not to be limited thereto, and that changes and modifications may be made therein without departing from the spirit of the invention or from the scope of the subjoined claims.

What is claimed is:

1. In a press having separable upper and lower mold sections for shaping and curing unvulcanized tire bands having beads while the pressure curing medium is in direct contact with the interior of the band, each of said mold sections having a bead seat, means to open and close said press by relative movement of said mold sections, and an annular member located between said mold sections for pressing said tire band beads into full engagement with said bead seats, said member being divided into a first and second group of interfitting segments, means to move both groups of said segments into end-to-end relation during curing and to collapse said segments after curing, comprising a rod located axially of the bead seat of said lower mold section, means to move said rod axially of said bead seat, a sleeve and collar slidably mounted on said rod linkage connecting said rod and sleeve to said first group of segments, and linkage connecting said sleeve and collar to said second group of segments, said linkage being constructed and arranged to swing said first group of segments inwardly toward said rod and raise them above the second group of segments and then sequentially to swing said second group of segments toward the rod upon opening of the press.

2. In a press having separable upper and lower mold sections for shaping and curing unvulcanized tire bands having beads while the pressure curing medium is in direct contact with the interior of the band, each of said mold sections having a bead seat, means to open and close said press by relative movement of said mold sections, and an annular member located between said mold sections for pressing said tire band beads into full engagement with said bead seats, said member being divided into a first and second group of interfitting segments, means to move both groups of said segments into end-to-end relation during curing and to collapse said segments after curing, comprising, a rod located axially of the bead seat of said lower mold section, means to move said rod axially of said bead seat, a sleeve and collar slidable on said rod, a link connecting each segment of said first group of segments to said rod and a second link connecting said segments to said sleeve, and a link connecting each segment of said second group of segments to said sleeve and a second link connecting said segments to said collar, said links being constructed and arranged to swing said first group of segments inwardly toward said rod and then sequentially to swing said second group of segments toward the rod upon opening of the press.

3. In a press having separable upper and lower mold sections for shaping and curing unvulcanized tire bands having beads while the pressure curing medium is in direct contact with the interior of the band, each of said mold sections having a bead seat, means to open and close said press by relative movement of said mold sections, and an annular member located between said mold sections for pressing said tire band beads into full engagement with said bead seats, said member being divided into a first and second group of interfitting segments, means to move both groups of said segments into end-to-end relation during curing and to collapse said segments after curing, comprising, a rod located axially of the bead seat of said lower mold section, means to move said rod axially of said bead seat, an axially adjacent sleeve and collar slidably mounted on said rod, a first link connecting each individual segment of said first group of segments and said rod, a second link connecting each individual segment of said first group of segments and said sleeve, a third link connecting each individual segment of said second group of segments and said sleeve, the connection of each said second and third link to said sleeve being axially closer to said collar than the connection of each said link to their respective segments when the ring is uncollapsed, a fourth link connecting each individual segment of said second group of segments and said collar, said linkage being constructed and arranged to swing said first group of segments inwardly toward said rod and raise them above the second group of segments and then sequentially to swing said second group of segments toward the rod upon opening of the press.

References Cited in the file of this patent

UNITED STATES PATENTS

| | | |
|---|---|---|
| 1,101,732 | Doughty | June 30, 1914 |
| 2,571,258 | Kolins | Oct. 16, 1951 |
| 2,645,265 | O'Neil | July 14, 1953 |
| 2,834,049 | White | May 13, 1958 |
| 2,901,771 | Frohlick et al. | Sept. 1, 1959 |
| 2,904,832 | Frohlick et al. | Sept. 22, 1959 |
| 2,904,833 | Frohlick et al. | Sept. 22, 1959 |
| 2,959,815 | Brundage | Nov. 15, 1960 |